US006243831B1

(12) United States Patent
Mustafa et al.

(10) Patent No.: US 6,243,831 B1
(45) Date of Patent: Jun. 5, 2001

(54) COMPUTER SYSTEM WITH POWER LOSS PROTECTION MECHANISM

(75) Inventors: Mazin A. Mustafa, Houston; Craig L. Chaiken, Tomball, both of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/183,955

(22) Filed: Oct. 31, 1998

(51) Int. Cl.[7] .................................................. G06F 1/32
(52) U.S. Cl. ................................. 714/24; 713/324
(58) Field of Search ..................... 714/22, 24, 23, 714/14; 713/320, 324, 340

(56) References Cited

U.S. PATENT DOCUMENTS

| 5,167,024 | * | 11/1992 | Smith et al. ..................... 395/375 |
| 5,485,623 | * | 1/1996 | Kurokawa et al. ................ 714/22 |
| 5,497,494 | * | 3/1996 | Combs et al. .................... 713/300 |
| 5,638,541 | * | 6/1997 | Sadashivaiah ................... 713/300 |
| 5,822,600 | * | 10/1998 | Hallowell et al. ................ 713/340 |
| 5,889,933 | * | 3/1999 | Smith ............................. 714/22 |
| 6,052,793 | * | 4/2000 | Mermelstein ................... 713/340 |
| 6,115,813 | * | 9/2000 | Hobson et al. .................. 713/1 |
| 6,122,748 | * | 9/2000 | Hobson ........................... 713/323 |
| 6,145,068 | * | 11/2000 | Lewis .............................. 711/170 |

FOREIGN PATENT DOCUMENTS 0 636 980 A1 * 2/1995 (EP) ............................. G06F/11/14

* cited by examiner

*Primary Examiner*—Robert Beausoleil
*Assistant Examiner*—Scott T. Baderman
(74) *Attorney, Agent, or Firm*—Akin, Gump, Strauss, Hauer & Feld, LLP

(57) ABSTRACT

A computer system protects against loss of a computer's volatile data using system ROM and operating system resources. Upon entry into a reduced power state, or sleep mode, the operating system directs device drivers to save the state of hardware registers to RAM. Then, the system ROM saves the contents of RAM to a file in a non-volatile storage medium, such as a hard disk drive. A bit is set in CMOS to indicate completion of this transfer.

Upon return from sleep mode, the system ROM clears the CMOS bit and returns to normal operation. However, if a system reboot occurs and the CMOS bit is set, the non-volatile storage file is retrieved, and its contents are restored to RAM. The operating system then directs device drivers to retrieve information from the restored RAM to reinitialize the hardware registers under their control. Thus, the integrity of volatile RAM is maintained following a power loss during a reduced power state.

21 Claims, 3 Drawing Sheets

COMPUTER SYSTEM WITH POWER LOSS PROTECTION MECHANISM

BACKGROUND OF THE INVENTION

1. Field of the Invention

The present invention relates to the protection of a computer system and, more particularly, to protection of data and applications stored in the memory of the computer system from losses due to interruption of power occurring during a sleep state.

2. Description of the Related Art

Power outages, or blackout periods, are occasionally encountered in large cities as well as in rural areas. Also common are brownout periods, in which the available electrical power is reduced, though not completely shut off, for a period of time. In most settings, blackout and brownout periods cause inconvenience, but nothing more. The temporary loss of, or reduction in, available power may result in loss of lighting, television and other electrical appliances for the duration of the blackout or brownout.

More problematically, some electrical devices can suffer loss of information during a blackout or brownout period. Many consumers, for example, have had to reset alarm clocks and reprogram video recorders after a blackout or brownout period. While this inconvenience may be troublesome, the loss of computer content during such a period may be catastrophic. This is because computer systems may have large amounts of data in active, volatile memory at any given time. As volatile media require continuous power to hold data, any data contained in volatile memory is lost during a power reduction, however fleeting the power loss may be. Consequently, power outages have been a major concern to the computer industry since its inception.

Portable computers are, by their very nature, typically powered by batteries rather than AC current. Because loss of battery power results in data loss, the issue of how to save active memory before power loss has been addressed with portable computers. One solution is to invoke a "hibernation" state when the computer detects a low battery condition. The hibernation routine creates a file to be stored on a non-volatile region of the computer, such as a mass storage device, terminates the user interface, stores the entire content of memory in the file, and then shuts down the computer. The hibernation mechanism therefore retains a "snapshot" of the system state until the battery is either recharged or replaced, or until another source of power, such as AC current, is provided to the portable computer system.

To support the hibernation feature, voltage level sensors within the battery of the portable computer system are monitored. When a predetermined threshold of remaining battery life is reached, the hibernation routines are initiated. Although quite useful in the battery-operated world of portable computers, the hibernation mechanism is not suitable for desktop computers. Desktop computers typically do not run on batteries, but generally rely on AC current as a power source. Thus, loss of power is less predictable than with battery-operated computers. Accordingly, the risk of losing memory content remains a considerable problem for non-portable (such as desktop) personal computers.

Another solution for avoiding catastrophic data loss is automatic periodic backup. Many software applications, for example, periodically store the current state of the application or open files to a backup region on the computer's hard drive. If a total or partial power outage occurs during the execution of such an application, a user may retrieve a copy of a reasonably recent version of the open file when power resumes. Thus, the user only loses some of the information that was recently provided to the application.

While periodic storage and backup of particular files is a sensible way to protect against power outages, doing the same for all the computer's memory is more problematic. Besides requiring a large commitment of resources (a non-volatile storage medium, hardware support, and software support, to name a few), a periodic backup of a computer's entire memory region takes more time than saving a single file. Furthermore, performing such a backup periodically, as would be necessary given the unpredictability of power loss, would be disruptive and annoying for the user. Finally, because power could completely fail before such a backup was complete, periodic automatic backup of the entire computer memory may not even succeed. Thus, such periodic backup of a computer's memory is not a particularly attractive solution.

Modern computer use is rapidly approaching the point in which many idle computers remain turned on. Leaving the computer on all the time allows many background functions to occur, such as receiving and forwarding electronic mail and facsimiles, as well as allowing "instant on" access to files when the user desires to return to the computer.

Consequently, some computer manufacturers have created a "sleep" state, in which computers may be operated at a reduced power consumption level. The "sleeping" computer can then be "awakened," or resumed, upon an event such as the receipt of electronic mail, a fax, or a user's keystroke. Reduced power consumption, even on a desktop computer, is thus useful in a number of situations when the user is not actively using the computer, but needs the computer to be available.

However, total and partial power outages can still occur when the computer is in a sleep mode. During sleep mode, output devices are generally disabled until the occurrence of an interrupting or waking event. However, anything that was loaded into memory before sleep mode remains stored in memory. As memory is volatile RAM, it requires a constant source of power; otherwise, its contents are lost. Thus, if a total or partial power outage occurs while the computer system is in a sleep mode, active memory is irretrievably lost. Because the occurrence of total and partial power outages is unpredictable and the resulting loss of information is so abrupt, there is little opportunity to detect the loss of power and create a hibernation file, as can be done in the more controlled environment of the portable computer. Desktop and other computer systems relying on AC power are therefore exposed to the risk catastrophic data loss when the computer is in a sleep state.

SUMMARY OF THE INVENTION

Briefly, the invention relates to a computer system for the safekeeping of its volatile information in anticipation of power loss that may occur while the computer is in a reduced power state. Upon initiation of a "sleep," or reduced power, mode, a file in a non-volatile location is created. The computer's volatile information, such as RAM and hardware register values, is then saved in the non-volatile file. Because sleep mode is initiated when the computer is not being used, the creation of and storage by the non-volatile file does not lessen the computer's operating time.

Upon completion of the non-volatile storage, a non-volatile storage bit is set in CMOS. Thereafter, if AC power is disrupted such that a the computer recycles power, or "warm-boots," the non-volatile bit is checked. If the bit is set, the non-volatile storage file is retrieved and its contents are restored to RAM. Thus, the state of the computer prior to disruption of AC power is restored. If, instead, the computer system returns from sleep mode, or resumes, the non-volatile storage bit is cleared and no retrieval of the non-volatile storage file is necessary. The computer simply resumes normal operation with the volatile memory contents intact.

The power loss protection mechanism of the invention involves interaction between the system's firmware and the operating system. The system's firmware is commonly located in ROM, or read-only memory. It contains both the power-on-self-test, or POST, code, which sets up the computer initially, and the basic input/output system, or BIOS, which provides an interface between the hardware of the system and other software. The operating system is higher level software, but it, too provides an interface to application software. Between the firmware and the operating system, generally, all the computer's devices are initialized and supported.

When the sleep mode is invoked, the BIOS first determines the amount of memory in the computer system. Then, the operating system requests that each device driver save the current state of registers associated with each device. These device drivers use memory for storing such information. Additionally, the BIOS saves all hardware registers to memory that are not coupled to a driver. Finally, the entire contents of memory are saved to the non-volatile storage file.

Most commonly, the non-volatile storage medium is a mass storage device such as a hard drive. When multiple mass storage devices are present in the computer system, each may be examined for storage capacity sufficient to contain the non-volatile storage file. In some embodiments, the non-volatile storage file can be broken up into several files, each stored in a separate mass storage device. Moreover, the power loss protection mechanism can be suppressed if a mass storage device holding one of these files is removed during the sleep state. Further, the power loss protection mechanism may allow the user to specify the location of the non-volatile storage file, while other embodiments may perform the device selection automatically.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
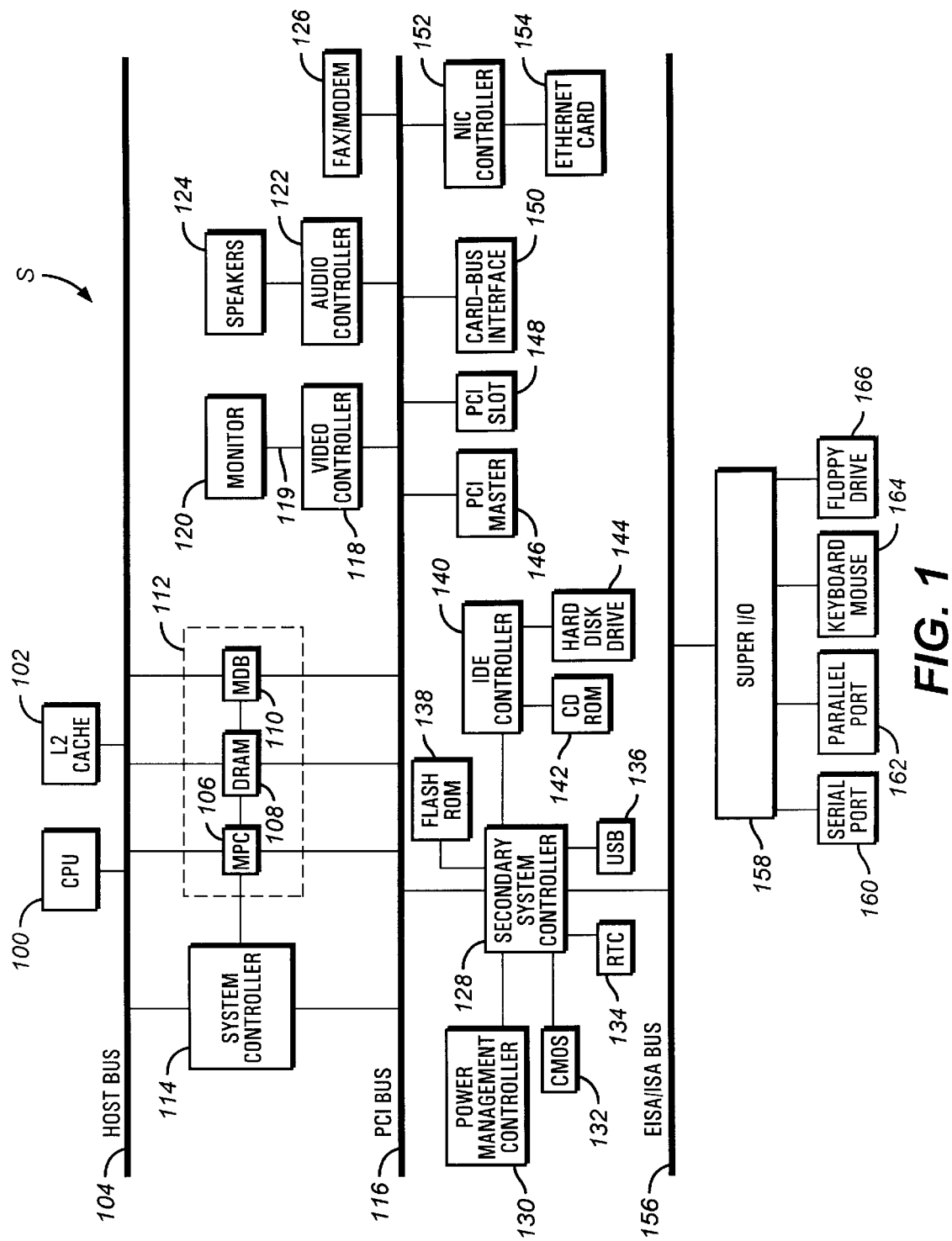
FIG. 1 is a block diagram of a desktop computer system in accordance with the present invention.

Referring to the drawings, FIG. 1 shows a computer system S according to the present invention. Within the computer system S, a processor 100, also known as a central processing unit, or CPU, is shown. The processor 100 may be a single microprocessor, such as Intel Corporation's 80486 or Pentium processors, or a more elaborate CPU system including multiple microprocessors, a cache controller, external co-processors, a level one (L1) cache, and other components, coupled to one another or to the host bus 104.

The CPU 100 is connected to a host bus 104, also known as a processor bus or high-speed local bus. The host bus 104 connects the processor 100 to the rest of the computer system S.

Additionally, a level two (L2) cache 102 is connected to host bus 104. The L2 cache 102 provides additional caching capabilities to the processor's L1 cache to improve performance. The cache 102 may be a write-through, a write-back, multi-level, or some other cache system for storing commonly or recently used data values. The cache 102 generally consists of a high-speed static RAM structure, addressable within the memory space of the processor's address lines.

Also coupled to the host bus 104 via a system controller 114 is a PCI bus 116. The system controller 114 acts as a host-to-PCI bridge and may act as a PCI bus master as well. Additionally, a high performance memory system 112 is shown, connected to both the local host bus 104 and the PCI bus 116. The memory system 112 includes a memory-to-PCI cache controller (MPC) 106, a dynamic random access memory (DRAM) array 108, and a memory data buffer (MDB) 110. The MPC 106 is connected to the DRAM array 108, which is further connected to the memory data buffer 110. The MPC 106, DRAM array 108, and memory data buffer 110 collectively form a high performance memory system 112 for the computer system S. The memory system 112 is connected to the system controller 114, which directs accesses to and from memory. The DRAM array 108 provides high-speed data storage for instructions and data needed for the processor 100 to perform its functions.

The PCI bus 116 is coupled to a plurality of additional peripheral devices, including a video card 118, an audio device or audio card 122, a fax modem 126, and in some embodiments an additional PCI bridge (not shown). The video card 118 typically includes a video controller, a graphics processor and a video graphics adapter (not shown), and is coupled to a monitor 120 via a coaxial cable 119 or other computer connector. The audio device or audio card 122 generally is coupled to audio speakers 124 or other audio output device.

The PCI bus 116 is also connected to a secondary system controller 128. The secondary system controller 128 is a PCI-to-ISA or PCI-to-EISA bridge. Additionally, the secondary system controller 128 provides various support functions for the desktop computer system S. The secondary system controller 128 of the exemplary system is a single integrated circuit that acts as a PCI bus master and slave, an ISA/EISA bus controller, an ISA/EISA write-posting buffer, an ISA/EISA bus arbiter, a DMA device, and an IDE disk interface.

A power management controller 130, CMOS 132, a real-time clock or RTC 134, a universal serial bus or USB 136, a flash ROM 138, and an IDE controller 140 are coupled to the secondary system controller 128. The flash ROM 138 may include non-volatile RAM, or NVRAM (not shown). The flash ROM 138 typically includes the system firmware, including the POST code, which is run automatically when power is applied to the system, and BIOS, which is additional code that is executed following POST. The firmware may be run statically from the flash ROM 138, or may be shadowed into system RAM and run dynamically from the RAM. In many computer systems, the hardware is configured according to the instructions in POST executed upon power up. In the exemplary embodiment, the flash ROM 138 can be reprogrammed to allow for revisions of the POST and BIOS code.

The IDE controller 140 may interface to a CD ROM drive 142 and a hard disk drive 144. The CD ROM 142 provides optical storage and data retrieval capabilities, and the hard disk drive 144 provides magnetic non-volatile storage capabilities to the computer system S. One or more PCI masters 146 may be connected on the PCI bus 116 in addition to the secondary system controller 128. Also typically connected to PCI bus 116 is a PCI slot 148 and a card-bus interface 150 for accepting expansion cards.

A network interface card, or NIC, controller 152 is shown attached to the PCI bus 116 for network communication between computer system S and other computers. Attached to the NIC controller 152 is an Ethernet card 154, but other network cards may be connected in its place.

Attached to the ISA/EISA bus 156 is a super I/O interface 156. The super I/O interface 156 drives one or more peripheral devices. The super I/O interface 156 is shown connected to a serial port 160, a parallel port 162, a keyboard/mouse connector 164, and floppy disk drive 166. The floppy disk drive 166, like the hard disk drive 144, provides non-volatile magnetic storage capabilities to the computer system S.

Additional system controllers may be included in the computer system S. Thus, the system may have multiple parallel ports, serial ports, keyboards, mice, and disk drives. Additionally, the system may have a plurality of PCI- and ISA-type peripherals on their respective buses. The availability of a plurality of slots allows more peripherals to be connected to the computer system S and contributes to its usability and flexibility. The flexibility of the computer system therefore is not restricted to the particular example shown in the figure.

The computer power loss protection mechanism uses both system ROM BIOS firmware and operating system software to retrieve and save volatile computer information into a nonvolatile storage medium. Preferably, the operating system used is Windows 98 or Windows NT 5.0, available from Microsoft Corporation, of Redmond, Washington. These operating systems support Advanced Configuration and Power Interface, or ACPI.

The ACPI specification provides a protocol for interaction between the computer system's BIOS and the operating system. Under this specification, several possible sleep states are defined for a computer system S that supports ACPI. The purpose of these sleep states is to reduce power when the computer system S is not in use.

For example, in the S1 sleeping state, the operating system saves all device configurations in RAM, then turns off the processor. Power to all devices and RAM remain. Upon return from S1, the processor is turned back on and the computer system S is operable from the point at which S1 was entered.

The S2 sleeping state is similar to S1, except that both the processor and cache are turned off by the operating system. Again, however, all devices and memory remain turned on in the S2 sleeping state. Upon return from S2, because the cache was turned off, an initial performance degradation occurs. Otherwise, the computer system S is operable from the point at which S2 was entered.

In the S3 sleeping state, all device configurations are saved in RAM by the operating system, and the operating system directs device drivers and BIOS to turn off all devices. Then, RAM is reduced to a lower power state. Upon return from S3, full power is restored to RAM, all devices are turned back on and reconfigured to the state they were in before S3 was entered by the device drivers and BIOS.

The S4 sleeping state is the lowest power state because RAM is turned off, in contrast to the S1, S2, and S3 sleeping states, where RAM continues to be powered. In the S4 sleeping state, all device configurations are saved to RAM under the direction of the operating system. Then, the operating system saves RAM to a hibernation file somewhere in a non-volatile storage medium. The operating system then powers down the computer system S, except for trickle current, in some cases. Resume from the S4 state results from a variety of events, dependent upon designer choices. For example, an incoming fax or phone call may trigger a return from S4. When resume occurs, the contents of the hibernation file are restored to RAM by the operating system, and all devices are re-powered and reconfigured to the pre-S4 state.

Any or all of the above sleeping states may be supported in computer system S. Typically, when the sleep mode is invoked, either due to a timeout or by a user pressing the sleep button, the computer system S will enter the lowest power state that it can. In the preferred embodiment, the BIOS contains a table which directs the operating system to invoke one of the states supported by the computer system S.

To support the computer power loss protection mechanism, when any of S1, S2 or S3 sleeping states are invoked, the BIOS of computer system S intercepts control from the operating system. The BIOS then emulates the mechanisms involved in the S4 sleeping state. That is, the operating system directs device drivers to turn off devices. These devices save their configurations to RAM. From here, the BIOS saves RAM to a hibernation file, just as the operating system would normally direct the BIOS to do in the S4 sleeping state.

Saving RAM to a hibernation file does not occur in ACPI-defined S1, S2, and S3 states. Further, by not entering ACPI-defined the S4 sleeping state, power is not disabled to the computer system S. Thus, a modified sleeping state is created for computer system S. It is during a power loss occurring within this modified sleeping state that the computer power loss protection mechanism may be invoked. The references to "sleep mode" which follow refer to this modified sleeping state.

Figure 2:
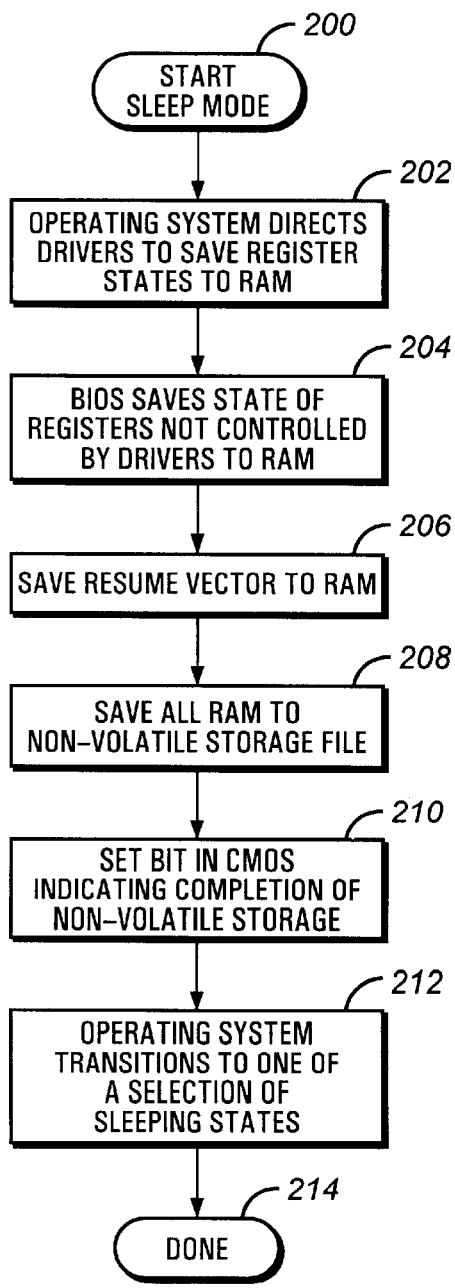
FIG. 2 is a flow diagram illustrating the steps taken according to the present invention by the computer power loss protection mechanism when a user invokes sleep mode.

FIG. 2 shows a flow diagram of the steps occur in sleep mode including the power loss protection mechanism of the invention. Sleep mode is first initiated at step 200. Sleep mode may result from some user action, such as pressing a dedicated sleep button or issuance of some predefined keystroke combination. Alternatively, sleep mode may result from non-activity on the computer. In the second case, the system may include BIOS or driver software that keeps track of the inactivity and invokes sleep upon exhaustion of a predetermined time period. Other methods for initiating sleep are possible as well.

At step 202, the operating system directs any software drivers that are loaded into the system to save all register states to some location in RAM. Each driver may have some RAM already allocated to it or may simply write to an unused portion of RAM. Next, at step 204, the system ROM BIOS saves the state of registers which are not controlled by drivers to RAM. In FIG. 1, for example, the BIOS saves the system controller 114, the secondary system controller 128, and the super I/O 158 registers to RAM, as these devices are not under software driver control. The foregoing steps thus transfer all volatile information in the computer system S to one location, that is, volatile RAM.

Finally, before transferring the contents of RAM to non-volatile storage, the resume vector is saved to RAM, in step 206. Upon returning from sleep mode, the resume vector directs the computer system S to the pertinent code for resuming operation.

At step 208, all the RAM in the computer system S is saved to a non-volatile storage file. Effectively, a "snapshot" of the computer's contents has been taken. The location of the nonvolatile storage file is determined based upon the resources of the system and the size of RAM. Alternatively, the file's location may be selected by the computer user. If multiple non-volatile storage media reside on the computer system S, the non-volatile storage file can be split into multiple parts, each part storing a different portion of RAM.

At step 210, a bit is set in CMOS to indicate completion of the transfer of RAM to the non-volatile storage medium. CMOS, or complementary metal oxide semiconductor, is a low-power memory that is typically powered by its own battery. It is generally used to store system information, such as the date, time, and setup parameters. Thus, CMOS is ideal for storing the bit that indicates non-volatile storage is complete. This non-volatile storage complete bit is later checked before restoration of the non-volatile storage file's contents to RAM can take place.

Finally, at step 212, the operating system transitions to one of many possible sleep states. The possible sleep states are defined by the operating system itself. At step 214, the "snapshot" of the computer's RAM is complete, and the computer is now in its sleep state.

As with entering sleep, resuming from sleep mode can be triggered a number of different ways. For example, the computer may have a sleep/resume button where sleep is initiated the first time it is pressed and resume is initiated the second time it is pressed. Alternatively, resume could be triggered by an event, such as receipt of a fax, receipt of electronic mail, or a user's keystroke.

In one embodiment, the external events that wake up the computer system S include the actuation of the ring indicator from the modem, the sleep button, PCMCIA card detect, and the ring indicator. The internal events that wake up the computer system S include events relating to an alarm from the real-time clock 134, the sleep time, the keyboard or mouse connected to keyboard/mouse interface 164, among others.

Figure 3:
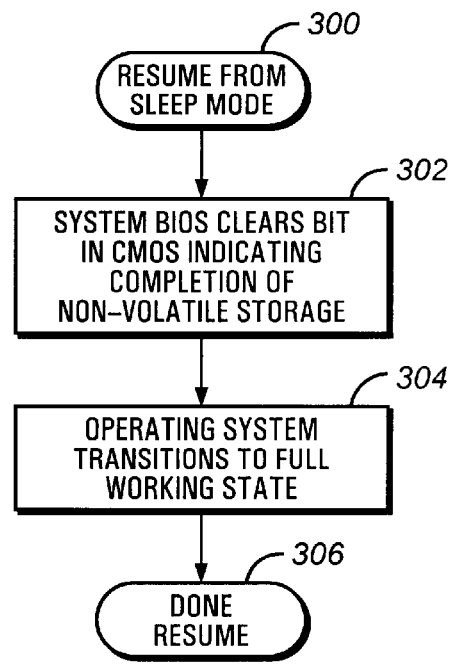
FIG. 3 is a flow diagram illustrating the steps taken according to the present invention by the computer power loss protection mechanism when the system exits sleep mode.

FIG. 3 is a flow diagram illustrating the steps taken when resuming from sleep mode according to the invention. At step 300, the resume operation commences. Next, at step 302, the system BIOS clears the non-volatile storage bit from CMOS. This is done so that the next time the system executes POST, it does not appear that retrieval due to power loss is necessary. This procedure is explained more fully in conjunction with the discussion of FIG. 4 below. At step 304, the operating system transitions to a full working state. At step 306, the resume from sleep is complete. No retrieval of the non-volatile storage file is necessary during a resume from sleep operation.

As described above, in computer systems supporting ACPI, several sleep modes are possible. Some of these sleep modes may cause some device content to be lost, even though no power loss has occurred. For those sleep states in which some device content is lost, the operating system is expected to keep track of the sleep mode and restore its contents as needed upon resuming from sleep mode.

Should power loss occur during sleep, the computer acts as if power had been turned off, then on again. That is, a power loss causes the computer to cycle power, or execute POST, just as if it had been turned on for the first time. Thus, returning from sleep mode is not an event that triggers the restoration of RAM from the non-volatile storage file.

Figure 4:
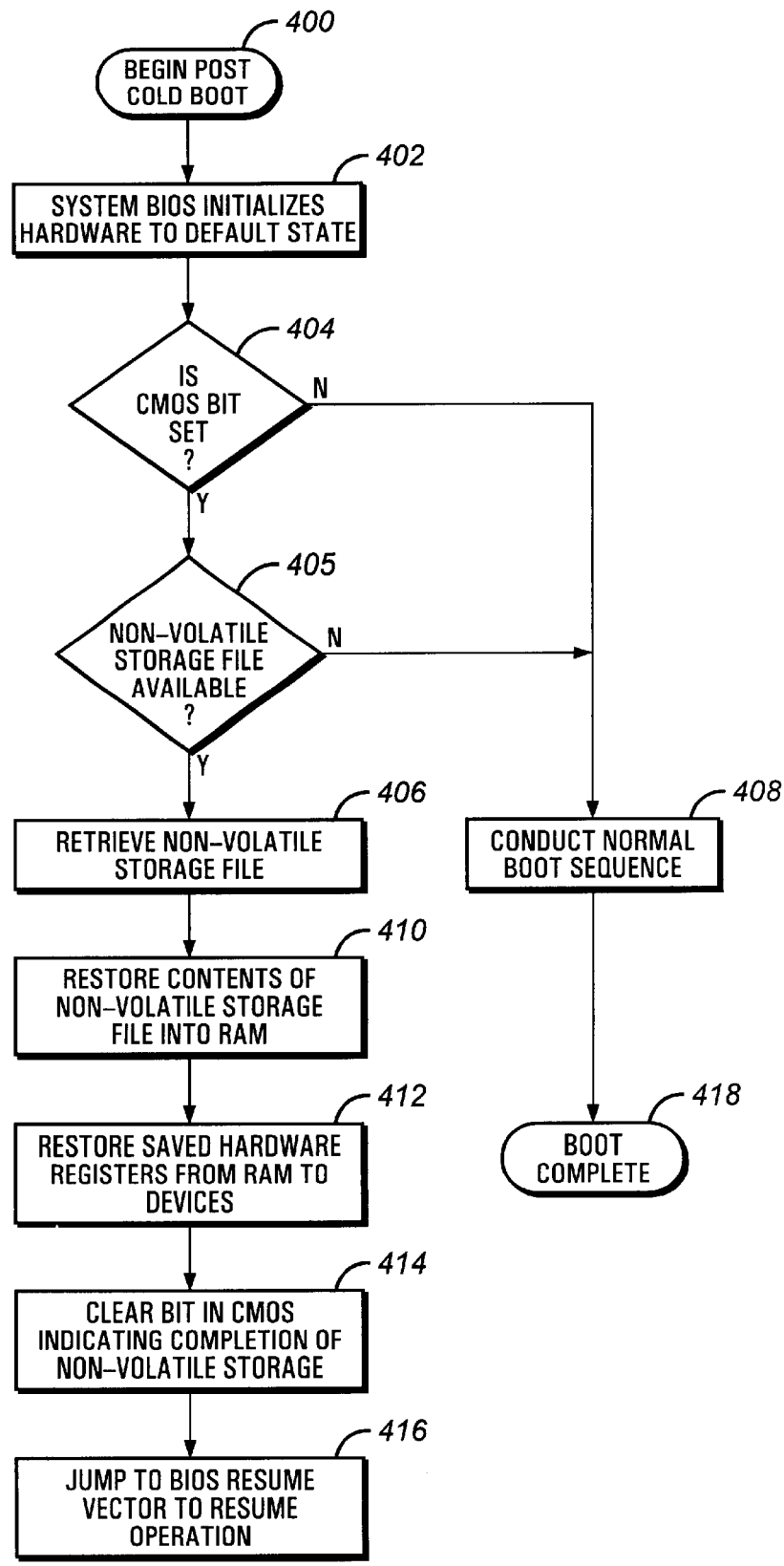
FIG. 4 is a flow diagram illustrating the steps taken according to the present invention during system power-on, including the power loss protection mechanism.

Instead, the restoration of RAM from the non-volatile storage file takes place during POST initialization. FIG. 4 is a flow diagram illustrating how the power loss protection mechanism works when a power loss occurs during sleep mode. At step 400, the power-on-self-test, or POST, code that resides in the system ROM begins execution. Any time the computer is turned on, it begins executing the POST code at the same place, known as the reset vector.

At step 402, the system POST initializes the hardware to some default state. At this point, the system may access boot devices and RAM. Next, at step 404, the POST code checks the CMOS bit that indicates completion of non-volatile storage of RAM. If the CMOS bit is cleared, a normal boot sequence is conducted, as shown in step 408. That is, the computer loss protection mechanism is not invoked.

Under normal boot circumstances, the CMOS bit is not set, as it is only set when invoking sleep mode after having saved RAM to a non-volatile storage medium (see FIG. 2). Also, the CMOS bit is not set if the transfer of RAM to non-volatile storage file fails for some reason. Finally, whenever the user exits sleep mode, or resumes, the CMOS bit is cleared. So, only during the anomalous situation where power was lost during sleep mode is the CMOS bit set.

If such a situation occurs, the CMOS bit is set, and control instead proceeds to step 405, where a determination is made whether the non-volatile storage file is available. There are several ways in which the presence of the file can be confirmed, including, but not limited to, keeping a "signature" of the file in the master boot record of the mass storage device where it was stored. System designers of ordinary skill in the art recognize that there are several ways in which a "signature" of the non-volatile storage file can be saved in computer system S. If the non-storage file is not found, control proceeds to step 408, where the system is booted as normal.

If, instead, the non-volatile storage file is found, control proceeds to step 406, where the non-volatile storage file is retrieved. In some embodiments, as noted, the RAM contents may have been saved in multiple files. Then, in step 410, the contents of the non-volatile storage file are restore to RAM. Next, control proceeds to step 412 where the device hardware registers are returned to their state prior to sleep mode. The values for these device registers were saved in RAM prior to entering sleep mode. Now that RAM is restored, these register values are retrieved. Some of the hardware registers were saved by device drivers, while other hardware registers were saved by the BIOS. Thus, the BIOS restores the hardware registers that are within its control, then directs the device drivers to do the same with hardware registers under each device driver's control.

Next, at step 414, the CMOS bit that indicates completion of non-volatile storage is cleared, as RAM has been fully restored and is likely to change. Finally, at step 416, the BIOS jumps to the resume vector. The resume vector is the place in the BIOS where execution begins upon return from sleep mode. Thus, the computer system S returns to the state it was in prior to entering sleep mode, just as if no power loss had occurred.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A computer system, comprising:

a microprocessor coupled to a bus;

a memory device coupled to the bus for storing volatile data;

a plurality of hardware registers coupled to hardware devices connected on the bus;

said microprocessor exhibiting a reduced power state in response to a predetermined condition;

a non-volatile storage medium; and a system ROM that, upon turning the computer system on, loads an operating system, wherein together the ROM and operating system:

upon initiation of a reduced power state, save all hardware registers to RAM and save RAM to a file in the non-volatile storage medium; and upon application of power to the computer system, retrieve the file in the non-volatile storage medium and restore the contents of the file to RAM.

2. The computer system of claim 1, wherein the predetermined condition results from a user pressing a standby button.

3. The computer system of claim 1, wherein the predetermined condition results from an expiration of a time period.

4. The computer system of claim 1, wherein upon completion of saving RAM to a file in the non-volatile storage medium during a reduced power state, a CMOS bit is set.

5. A method for protecting a computer system against loss of data in RAM during a reduced power state, the method comprising the steps of:

saving all hardware register values to RAM;

determining the total amount of RAM in the computer system;

storing the contents of RAM to a file in a non-volatile storage medium;

retrieving the file in the non-volatile storage medium, following occurrence of a power loss during the reduced power state, upon restoration of power; and restoring the contents of the file in the non-volatile storage medium to RAM.

6. The method of claim 5, wherein the steps of saving all hardware register values to RAM, determining the total amount of RAM in the computer system, and storing the contents of RAM to a file in a non-volatile storage medium are performed upon entering the reduced power state.

7. The method of claim 5, wherein, upon completion of the step of saving the contents of RAM to the non-volatile storage medium, a bit in CMOS is set.

8. The method of claim 7, wherein the steps of retrieving the file in the non-volatile storage medium and restoring the contents of the file in the non-volatile storage medium to RAM do not occur unless the CMOS bit is set.

9. The method of claim 5, wherein the non-volatile storage medium is a hard disk drive.

10. The method of claim 6, wherein the step for saving all hardware register values to RAM is performed by both software drivers coupled to devices in the computer system and by a system ROM.

11. A computer system, comprising:

a system bus;

a microprocessor coupled to the bus;

a RAM coupled to the bus;

a non-volatile storage medium coupled to the bus; and a medium readable by the microprocessor for protecting the computer system against loss of data in RAM during a reduced power state, the medium comprising code for:

saving all hardware register values to RAM;

determining the total amount of RAM in the computer system;

storing the contents of RAM to a file in the non-volatile storage medium;

retrieving the file in the non-volatile storage medium following occurrence of a power loss during the reduced power state, upon restoration of power; and restoring the contents of the file in the non-volatile storage medium to RAM.

12. The computer system of claim 11, wherein the non-volatile storage medium is comprised of a plurality of hard disk drives.

13. The computer system of claim 11, wherein the medium readable by the microprocessor is a read-only memory.

14. The computer system of claim 13, wherein the read-only memory is erasable and programmable.

15. The computer system of claim 13, wherein the code for saving all hardware register values to RAM, determining the total amount of RAM in the computer system, and storing the contents of RAM to a file in a non-volatile storage medium is executed upon entering the reduced power state.

16. The computer system of claim 15, wherein the reduced power state is achieved by pressing a standby button.

17. A medium readable by a microprocessor in a computer system for protecting the computer system against loss of data in RAM during a reduced power state, the medium comprising code for:

saving all hardware register values to RAM;

determining the total amount of RAM in the computer system;

storing the contents of RAM to a file in a non-volatile storage medium;

retrieving the file in the non-volatile storage medium following occurrence of a power loss during the reduced power state, upon restoration of power; and restoring the contents of the file in the non-volatile storage medium to RAM.

18. The medium of claim 17, wherein the reduced power state is achieved by pressing a standby button.

19. The medium of claim 17, wherein the code that saves all hardware register values to RAM, determines the total amount of RAM in the computer system, and stores the contents of RAM to a file in a non-volatile storage medium is executed upon entering the reduced power state.

20. The medium of claim 17, wherein the non-volatile storage medium is comprised of a plurality of hard disk drives.

21. The medium of claim 17, wherein the code additionally sets a bit in CMOS upon completion of storing the contents of RAM to the non-volatile storage medium.

* * * * *